United States Patent
Matsumoto

(10) Patent No.: US 9,900,331 B2
(45) Date of Patent: Feb. 20, 2018

(54) LOG TRACING APPARATUS AND NON-TRANSITORY COMPUTER-READABLE MEDIUM STORING A LOG TRACING PROGRAM

(71) Applicant: Mitsubishi Electric Corporation, Tokyo (JP)

(72) Inventor: Mitsuhiro Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/547,308

(22) PCT Filed: Feb. 13, 2015

(86) PCT No.: PCT/JP2015/053914
§ 371 (c)(1),
(2) Date: Jul. 28, 2017

(87) PCT Pub. No.: WO2016/129093
PCT Pub. Date: Aug. 18, 2016

(65) Prior Publication Data
US 2018/0027005 A1   Jan. 25, 2018

(51) Int. Cl.
*G06F 12/14* (2006.01)
*H04L 29/06* (2006.01)
*G06F 17/18* (2006.01)

(52) U.S. Cl.
CPC .......... *H04L 63/1425* (2013.01); *G06F 17/18* (2013.01); *H04L 63/1416* (2013.01)

(58) Field of Classification Search
None
See application file for complete search history.

(56) References Cited

U.S. PATENT DOCUMENTS

2004/0073534 A1* 4/2004 Robson ............. G06F 17/30595
2004/0148327 A1 7/2004 Satomi et al.
(Continued)

FOREIGN PATENT DOCUMENTS

JP   2001-184235 A   7/2001
JP   2004-227360 A   8/2004
(Continued)

OTHER PUBLICATIONS

Mukosaka et al., "An Integrated Visualization System of Temporal, Logical and Geographical Information for Internal Network Monitoring", Information Processing Society of Japan, vol. 49, No. 1, Jan. 2008, pp. 503-512.

*Primary Examiner* — Brandon S Hoffman
(74) *Attorney, Agent, or Firm* — Birch, Stewart, Kolasch & Birch, LLP

(57) ABSTRACT

An association degree computation unit computes a same period probability between respective types of events that occurred during a same period, based on occurrence times of log data, and computes an association degree between the respective types, using the same period probability. A corresponding type identification unit identifies the types corresponding to each other, using the association degree computed by the association degree computation unit. The log association unit generates synthesized log data that makes association between the log data of the corresponding types identified by the corresponding event identification unit and with the occurrence times thereof included in the same period.

8 Claims, 23 Drawing Sheets

(56) References Cited

U.S. PATENT DOCUMENTS

| | | |
|---|---|---|
| 2004/0148389 A1 | 7/2004 | Satomi et al. |
| 2005/0283680 A1 | 12/2005 | Kobayashi et al. |
| 2006/0015325 A1* | 1/2006 | Moore .................. G06F 17/277 704/9 |
| 2006/0048004 A1 | 3/2006 | Kawashima |
| 2007/0260931 A1 | 11/2007 | Aguilar-Macias et al. |
| 2011/0302131 A1 | 12/2011 | Kawaba |
| 2014/0149524 A1 | 5/2014 | Watanabe et al. |

FOREIGN PATENT DOCUMENTS

| | | |
|---|---|---|
| JP | 2005-38116 A | 2/2005 |
| JP | 2006-4346 A | 1/2006 |
| JP | 2006-99745 A | 4/2006 |
| JP | 2006-268688 A | 10/2006 |
| JP | 2006-304108 A | 11/2006 |
| JP | 2007-213521 A | 8/2007 |
| JP | 4129207 B2 | 8/2008 |
| JP | 4242852 B2 | 3/2009 |
| JP | 4300808 B2 | 7/2009 |
| JP | 4487291 B2 | 6/2010 |
| JP | 2011-197817 A | 10/2011 |
| JP | 2011-253355 A | 12/2011 |
| JP | 2012-94161 A | 5/2012 |
| JP | 5364776 B2 | 12/2013 |
| JP | 5454363 B2 | 3/2014 |
| JP | 2014-106851 A | 6/2014 |

* cited by examiner

Fig. 4

21: COMMUNICATION LOG DATA

| OCCURRENCE DATE AND TIME | TYPE | ACCESS SOURCE HOST | ACCESS DESTINATION HOST | ACCESS DESTINATION PORT |
|---|---|---|---|---|
| 2014/12/02 9:00:00 | http | CLIENT131a | SERVER132a | 80 |
| 2014/12/02 9:00:00 | pop3 | CLIENT131a | SERVER132a | 110 |
| 2014/12/02 9:05:00 | ftp | CLIENT131a | SERVER132a | 20 |
| 2014/12/02 9:10:00 | http | CLIENT131a | SERVER132a | 80 |
| 2014/12/02 9:15:00 | smtp | CLIENT131a | SERVER132a | 25 |
| 2014/12/02 9:20:00 | http | CLIENT131a | SERVER132a | 80 |
| 2014/12/02 9:25:00 | pop3 | CLIENT131a | SERVER132a | 110 |
| 2014/12/02 9:30:00 | http | CLIENT131a | SERVER132a | 80 |
| 2014/12/02 9:35:00 | smtp | CLIENT131a | SERVER132a | 25 |
| 2014/12/02 9:40:00 | http | CLIENT131a | SERVER132a | 80 |

Fig. 5

22: APPLICATION LOG DATA

| OCCURRENCE DATE AND TIME | TYPE | CONTENTS |
|---|---|---|
| 2014/12/02 9:00:00 | App1 | MOVED TO PAGE OF A11 |
| 2014/12/02 9:00:00 | App2 | MAIL A21 RECEIVED |
| 2014/12/02 9:00:00 | App3 | FILE A31 EDITED |
| 2014/12/02 9:05:00 | App3 | FILE A32 DOWNLOADED FROM SERVER A33 |
| 2014/12/02 9:10:00 | App1 | MOVED TO PAGE OF A12 |
| 2014/12/02 9:10:00 | App2 | MAIL A21 MOVED TO HOLDER A22 |
| 2014/12/02 9:10:00 | App3 | FILE A32 MOVED TO HOLDER A34 |
| 2014/12/02 9:15:00 | App2 | MAIL A23 TRANSMITTED |
| 2014/12/02 9:15:00 | App3 | FILE A35 READ |
| 2014/12/02 9:20:00 | App1 | MESSAGE TRANSMITTED FROM PAGE OF A12 |
| 2014/12/02 9:20:00 | App3 | FILE A36 RENAMED |
| 2014/12/02 9:25:00 | App2 | ERROR MESSAGE A24 RECEIVED |
| 2014/12/02 9:30:00 | App1 | MOVED TO PAGE OF A13 |
| 2014/12/02 9:30:00 | App3 | FILE A35 DELETED |
| 2014/12/02 9:35:00 | App2 | MAIL 23 TRANSMITTED |
| 2014/12/02 9:40:00 | App1 | IMAGE A14 DOWNLOADED FROM PAGE OF A13 |
| 2014/12/02 9:40:00 | App3 | FILE A36 CREATED |

Fig. 6

App1

| OCCURRENCE DATE AND TIME | CONTENTS |
|---|---|
| 2014/12/02 9:00:00 | MOVED TO PAGE OF A11 |
| 2014/12/02 9:10:00 | MOVED TO PAGE OF A12 |
| 2014/12/02 9:20:00 | MESSAGE TRANSMITTED FROM PAGE OF A12 |
| 2014/12/02 9:30:00 | MOVED TO PAGE OF A13 |
| 2014/12/02 9:40:00 | IMAGE A14 DOWNLOADED FROM PAGE OF A13 |

Fig. 7

App2

| OCCURRENCE DATE AND TIME | CONTENTS |
|---|---|
| 2014/12/02 9:00:00 | MAIL A21 RECEIVED |
| 2014/12/02 9:10:00 | MAIL A21 MOVED TO HOLDER A22 |
| 2014/12/02 9:15:00 | MAIL A23 TRANSMITTED |
| 2014/12/02 9:25:00 | ERROR MESSAGE A24 RECEIVED |
| 2014/12/02 9:35:00 | MAIL 23 TRANSMITTED |

Fig. 8

App3

| OCCURRENCE DATE AND TIME | CONTENTS |
|---|---|
| 2014/12/02 9:00:00 | FILE A31 EDITED |
| 2014/12/02 9:05:00 | FILE A32 DOWNLOADED FROM SERVER A33 |
| 2014/12/02 9:10:00 | FILE A32 MOVED TO HOLDER A34 |
| 2014/12/02 9:15:00 | FILE A35 READ |
| 2014/12/02 9:20:00 | FILE A36 RENAMED |
| 2014/12/02 9:30:00 | FILE A35 DELETED |
| 2014/12/02 9:40:00 | FILE A36 CREATED |

Fig. 12

14 : SAME PERIOD OCCURRENCE TABLE

|      | App1 | App2 | App3 | NUMBER OF TIMES OF OCCURRENCE |
|------|------|------|------|-------------------------------|
| http | 5    | 2    | 5    | 5                             |
| smtp | 0    | 2    | 1    | 2                             |
| pop3 | 1    | 2    | 1    | 2                             |
| ftp  | 0    | 0    | 1    | 1                             |

Fig. 14

15 : ASSOCIATION DEGREE TABLE

|  | App1 | App2 | App3 |
|---|---|---|---|
| http | 2 | 0.57 | 1 |
| smtp | 0 | 1.4 | 0.5 |
| pop3 | 1 | 1.4 | 0.5 |
| ftp | 0 | 0 | 1 |

Fig. 15

16 : CORRESPONDING TYPE TABLE

| COMMUNICATION SERVICE | ASSOCIATED APPLICATION |
|---|---|
| http | App1 |
| smtp | App2 |
| pop3 | App2 |
| ftp | App3 |

Fig. 16

12 : SYNTHESIZED LOG DATA

| OCCURRENCE DATE AND TIME | TYPE OF COMMUNICATION EVENT | ACCESS SOURCE HOST | ACCESS DESTINATION HOST | ACCESS DESTINATION PORT | TYPE OF APPLICATION EVENT | CONTENTS |
|---|---|---|---|---|---|---|
| 2014/12/02 9:00:00 | http | CLIENT 131a | SERVER 132a | 80 | App1 | MOVED TO PAGE OF A11 |
| 2014/12/02 9:00:00 | pop3 | CLIENT 131a | SERVER 132a | 110 | App2 | MAIL A21 RECEIVED |
| 2014/12/02 9:05:00 | ftp | CLIENT 131a | SERVER 132a | 20 | App3 | FILE A32 DOWNLOADED FROM SERVER A33 |
| 2014/12/02 9:10:00 | http | CLIENT 131a | SERVER 132a | 80 | App1 | MOVED TO PAGE OF A12 |
| 2014/12/02 9:15:00 | smtp | CLIENT 131a | SERVER 132a | 25 | App2 | MAIL A23 TRANSMITTED |
| 2014/12/02 9:20:00 | http | CLIENT 131a | SERVER 132a | 80 | App1 | MESSAGE TRANSMITTED FROM PAGE OF A12 |
| 2014/12/02 9:25:00 | pop3 | CLIENT 131a | SERVER 132a | 110 | App2 | ERROR MESSAGE A24 RECEIVED |
| 2014/12/02 9:30:00 | http | CLIENT 131a | SERVER 132a | 80 | App1 | MOVED TO PAGE OF A13 |
| 2014/12/02 9:35:00 | smtp | CLIENT 131a | SERVER 132a | 25 | App2 | MAIL A23 TRANSMITTED |
| 2014/12/02 9:40:00 | http | CLIENT 131a | SERVER 132a | 80 | App1 | IMAGE A14 DOWNLOADED FROM PAGE OF A13 |

Fig. 19

17 : OCCURRENCE PROBABILITY TABLE

|       | App1 | App2 | App3 |
|-------|------|------|------|
| http  | 1    | 0.4  | 1    |
| smtp  | 0    | 1    | 0.5  |
| pop3  | 0.5  | 1    | 0.5  |
| ftp   | 0    | 0    | 1    |
| TOTAL | 1.5  | 2.4  | 3    |

Fig. 20

15: ASSOCIATION DEGREE TABLE

|  | App1 | App2 | App3 |
|---|---|---|---|
| http | 1.1 | 0.27 | 0.52 |
| smtp | 0 | 0.67 | 0.26 |
| pop3 | 0.54 | 0.67 | 0.26 |
| ftp | 0 | 0 | 0.52 |

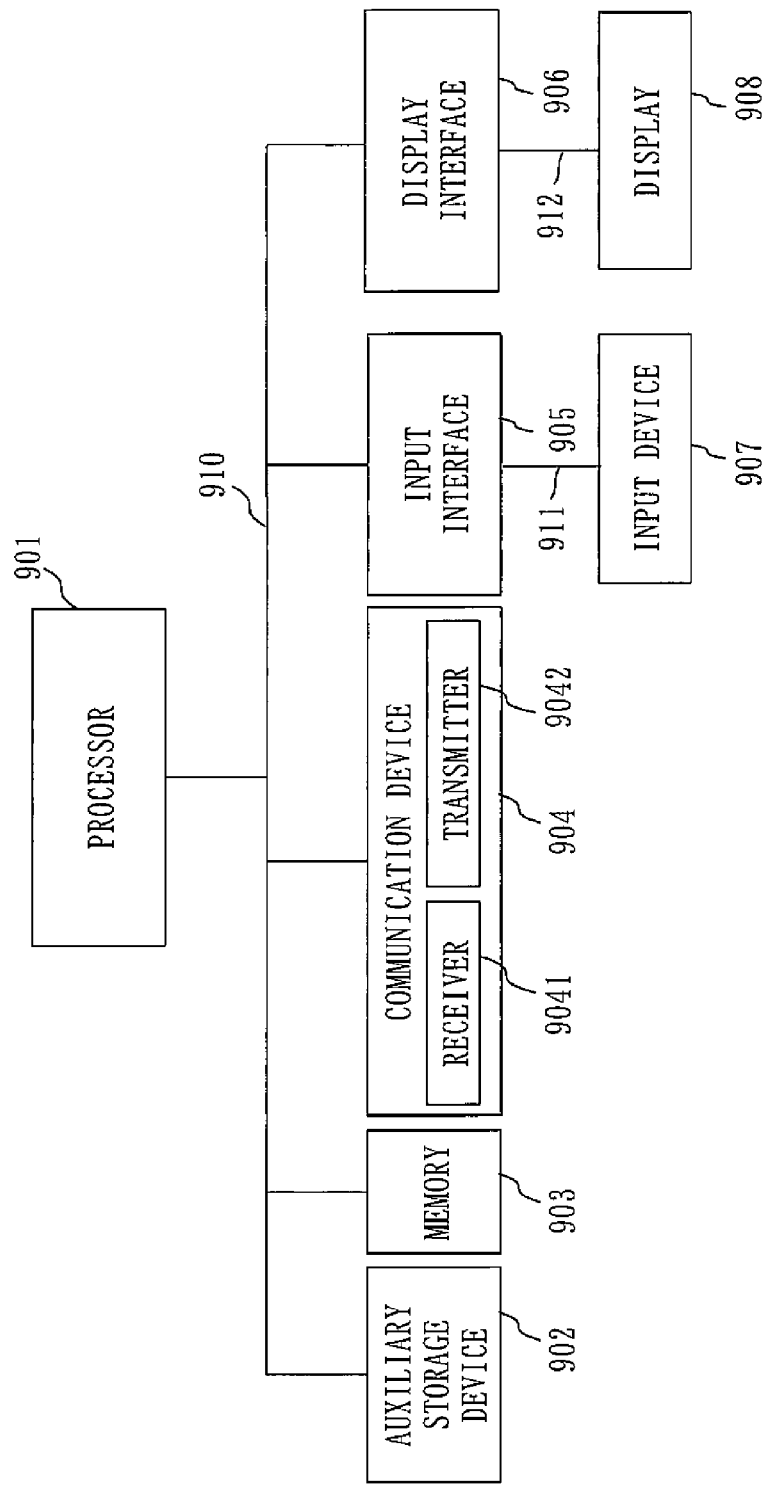

LOG TRACING APPARATUS AND NON-TRANSITORY COMPUTER-READABLE MEDIUM STORING A LOG TRACING PROGRAM

TECHNICAL FIELD

The present invention relates to a technique of tracing various types of log data output from an information system.

BACKGROUND ART

Each of Patent Literatures 1 and 2 describes a technique of tracing log data.

Patent Literature 1 describes identification of an association between log data by causing learning of a relationship between the log data in advance. Patent Literature 2 describes extraction of a flow of a series of processes by collecting log data corresponding to session information of each server.

CITATION LIST

Patent Literature

Patent Literature 1: JP 2006-304108A
Patent Literature 2: JP 2004-227360A

SUMMARY OF INVENTION

Technical Problem

In the method described in Patent Literature 1, the learning in advance needs to be performed using test data in order to identify the association between the log data. In the method described in Patent Literature 2, a common identifier of the session information needs to be used in order to identify an association between the log data. Therefore, it may be difficult to introduce these methods into an existing system.

An object of the present invention is to identify an association between log data using a method that is easy to be introduced into an existing system.

Solution to Problem

A log tracing apparatus according to the present invention may include:

an acquisition unit to acquire log data indicating occurrence times of a respective plurality of types of events;

an association degree computation unit to compute a same period probability between the respective types of the events that occurred during a same period, based on the occurrence times indicated by the log data acquired by the acquisition unit and to compute an association degree between the respective types, using the same period probability;

a corresponding type identification unit to identify the types corresponding to each other, based on the association degree computed by the association degree computation unit; and a log association unit to make association between the log data of the corresponding types identified by the corresponding type identification unit and with the occurrence times thereof included in the same period.

Advantageous Effects of Invention

In the present invention, the association degree between the respective types of the log data is computed, based on the same period probability between the respective types of the log data that occurred during the same period. Then, association between the log data is made, based on the association degree and the occurrence times. Therefore, the association between the log data may be identified, without performing learning in advance and without using a common identifier. Since there is no need for performing the leaning in advance and using the common identifier, introduction into an existing system is easy.

BRIEF DESCRIPTION OF DRAWINGS

FIG. 4 is a table illustrating examples of communication log data 21.

FIG. 5 is a table illustrating examples of application log data 22.

FIG. 6 is a table illustrating APP1 (Web) log data among the application log data 22 given in FIG. 5.

FIG. 7 is a table illustrating APP2 (Mail) log data among the application log data 22 given in FIG. 5.

FIG. 8 is a table illustrating APP3 (file access) log data among the application log data 22 given in FIG. 5.

FIG. 12 is a table illustrating an example of a same period occurrence table 14.

FIG. 14 is a table illustrating an example of an association degree table 15.

FIG. 15 is a table illustrating an example of a corresponding type table 16.

FIG. 16 is a table illustrating examples of synthesized log data 12

FIG. 19 is a table illustrating an example of an occurrence probability table 17.

FIG. 20 is a table illustrating the association degree table 15 computed by using the same period occurrence table 14 given in FIG. 12.

FIG. 23 is a diagram illustrating a hardware configuration example of the log tracing apparatus 113 according to each of the first to third embodiments.

DESCRIPTION OF EMBODIMENTS

First Embodiment

\*\*\*Description of Configuration\*\*\*

Figure 1:
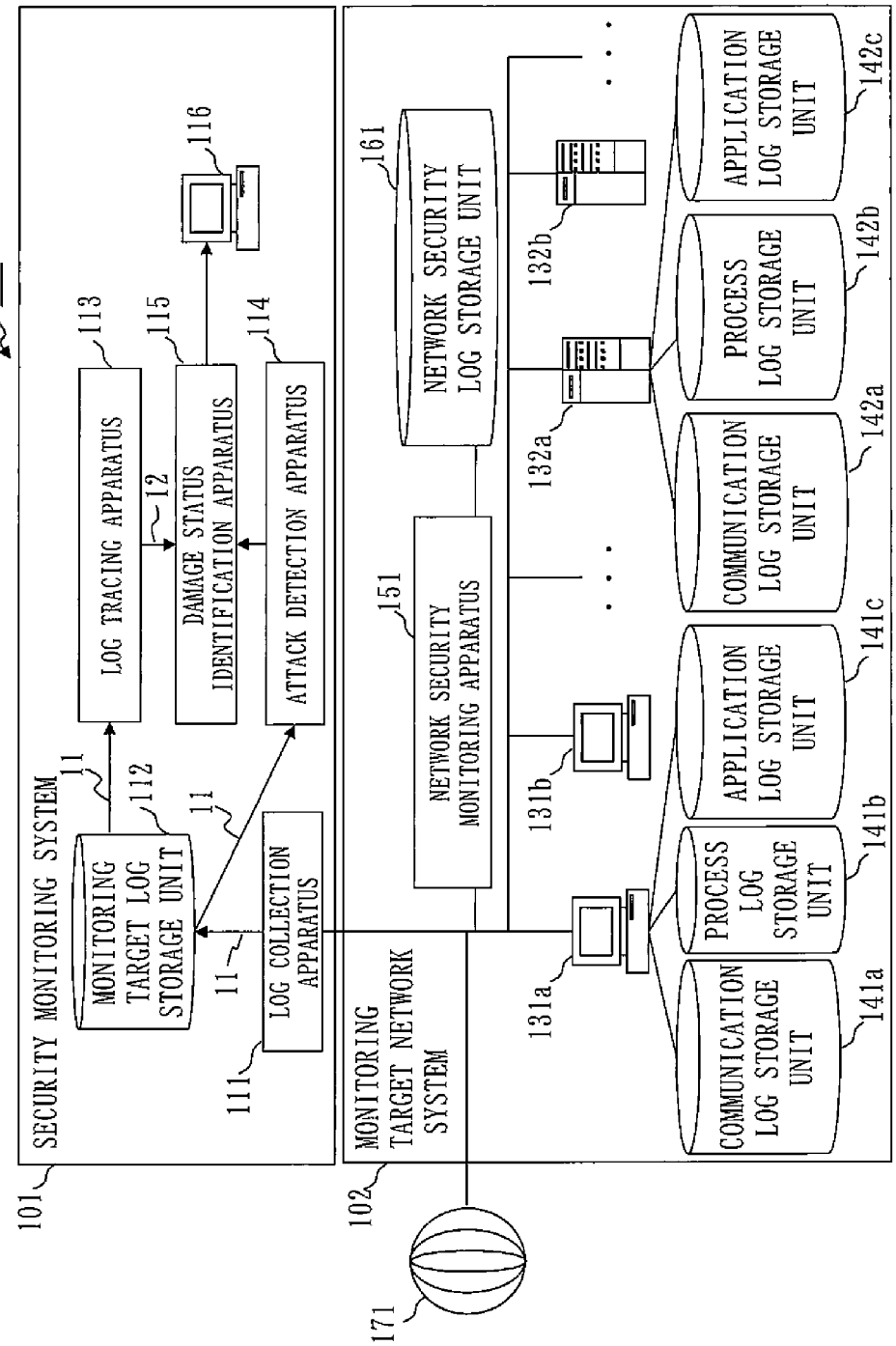
FIG. 1 is a configuration diagram of a log tracing system 100 according to a first embodiment.

FIG. 1 is a configuration diagram of a log tracing system 100 according to a first embodiment.

The log tracing system 100 includes a security monitoring system 101 and a monitoring target network system 102. The security monitoring system 101 is a system to monitor a monitoring target. The monitoring target network system 102 is a system to be monitored by the security monitoring system 101.

The security monitoring system 101 includes a log collection apparatus 11l, a monitoring target log storage unit 112, a log tracing apparatus 113, an attack detection apparatus 114, a damage status identification apparatus 115, and a monitoring terminal 116.

The log collection apparatus 111 is an apparatus to collect log data 11 from the monitoring target network system 102.

The monitoring target log storage unit 112 is a storage apparatus to store the log data 11 collected by the log collection apparatus 111.

The log tracing apparatus 113 is an apparatus to make association between the log data 11 stored in the monitoring target log storage unit 112 and to generate synthesized log data 12.

The attack detection apparatus 114 is an apparatus to detect an attack on the monitoring target network system 102, based on the log data 11 stored in the monitoring target log storage unit 112.

The damage status identification apparatus 115 is an apparatus to identify a damage status by referring to the synthesized log data 12 associated by the log tracing apparatus 113 when the attack is detected by the attack detection apparatus 114.

The monitoring terminal 116 is a terminal to be used by a manager of the security monitoring system 101 and is a terminal for referring to the damage status identified by the damage status identification apparatus 115.

The monitoring target network system 102 is connected to an Internet 171. Therefore, the monitoring target network system 102 may be attacked through the Internet 171.

The monitoring target network system 102 includes a plurality of clients 131, a plurality of servers 132, and a network security monitoring apparatus 151.

Each client 131 is a terminal to be used by a user.

To each client 131, a plurality of log storage units 141 to store the log data 11 on various types of events that occurred at that client 131 are connected. Herein, a communication log storage unit 141a, a process log storage unit 141b, and an application log storage unit 141c are connected as the log storage units 141.

Each server 132 is an apparatus to provide a service to each client 131.

To each server 132, a plurality of log storage units 142 to store the log data 11 on various types of events that occurred at that server 132 are connected. Herein, a communication log storage unit 142a, a process log storage unit 142b, and an application log storage unit 142c are connected as the log storage units 142.

The network security monitoring apparatus 151 is an apparatus to monitor a network of the monitoring target network system 102.

To the network security monitoring apparatus 151, a network security log storage unit 161 to store the log data 11 obtained by the monitoring by the network security monitoring apparatus 151 is connected.

The log collection apparatus 111 collects the log data 11 stored in each log storage unit 141 connected to each client 131, each log storage unit 142 connected to each server 132, and the network security log storage unit 161 connected to the network security monitoring apparatus 151.

Figure 2:
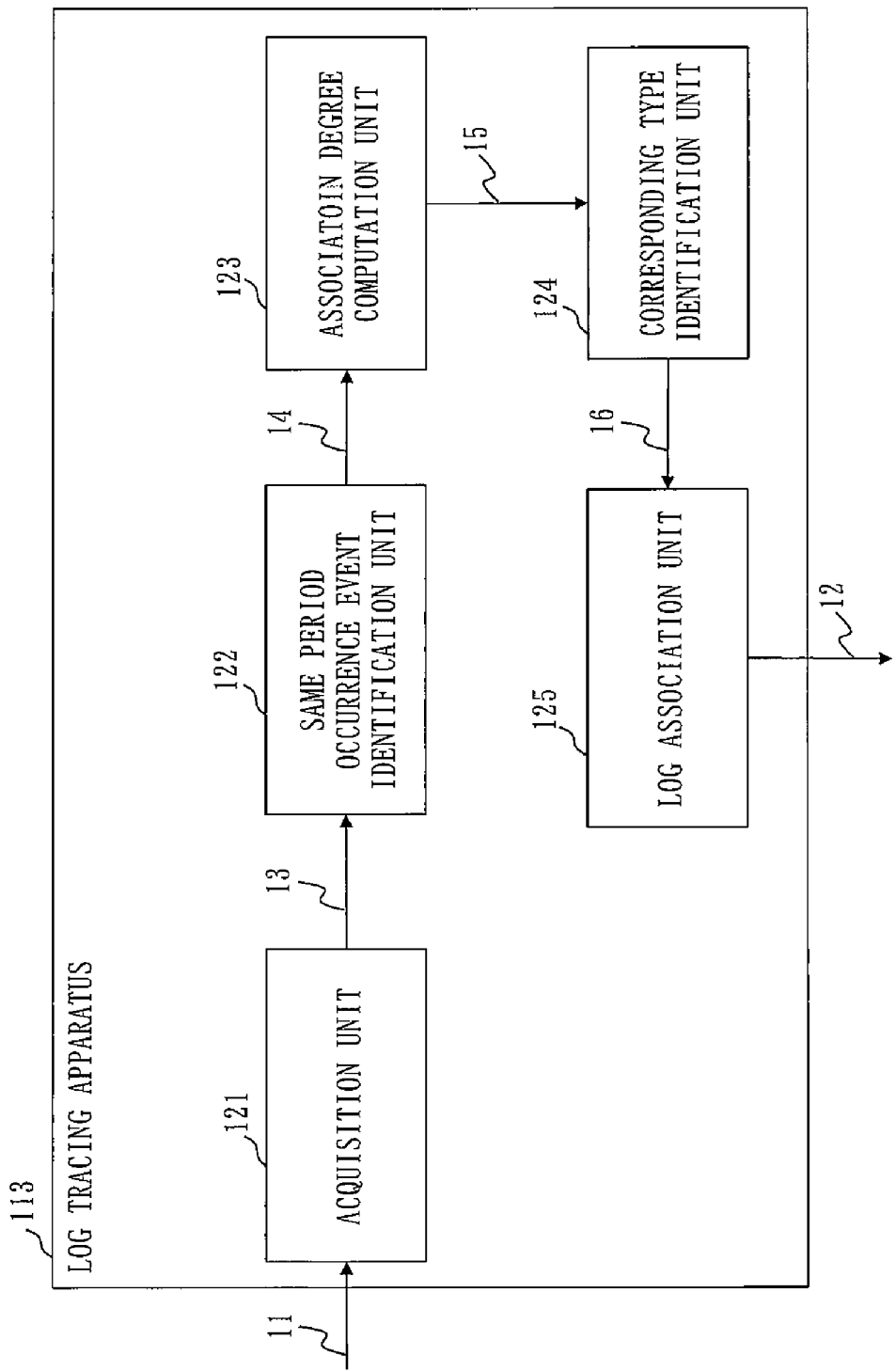
FIG. 2 is a configuration diagram of a log tracing apparatus 113 according to the first embodiment.
Figure 3:
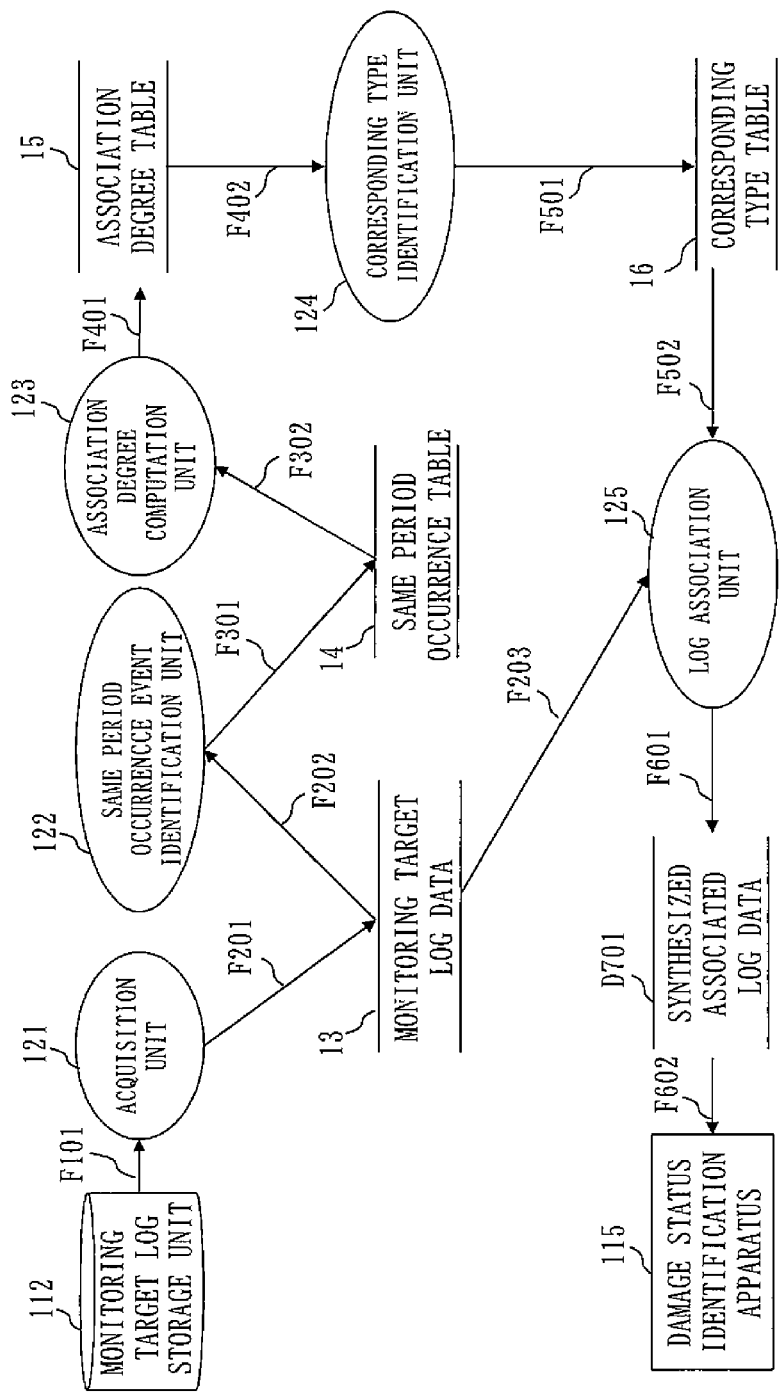
FIG. 3 is a data flow diagram of the log tracing apparatus 113 according to the first embodiment.

FIG. 2 is a configuration diagram of the log tracing apparatus 113 according to the first embodiment. FIG. 3 is a data flow diagram of the log tracing apparatus 113 according to the first embodiment.

The log tracing apparatus 113 includes an acquisition unit 121, a same period occurrence event identification unit 122, an association degree computation unit 123, a corresponding type identification unit 124, and a log association unit 125.

The acquisition unit 121 acquires the log data 11 indicating the occurrence time of each of a plurality of types of the events (F101). The acquisition unit 121 sets the acquired log data 11 to monitoring target log data 13 (F201).

The same period occurrence event identification unit 122 generates a same period occurrence table 14 that has identified the types of the events that occurred during a same period between the respective types of the events (F301), based on the occurrence time indicated by the monitoring target log data 13 stored by the acquisition unit 121 (F202).

The association degree computation unit 123 computes a same period probability between the respective types of the events that occurred during the same period by referring to the same period occurrence table 14 generated by the same period occurrence event identification unit 122 (F302). Then, the association degree computation unit 123 generates an association degree table 15 in which an association degree between the respective types has been computed, using the same period probability (F401).

Using the association degree table 15 computed by the association degree computation unit 123 (F402), the corresponding type identification unit 124 generates a corresponding type table 16 that has identified the event types corresponding to each other (F501).

The log association unit 125 generates the synthesized log data 12 (F601) obtained by synthesizing the monitoring target log data 13 (F203) by referring to the correspondence type table 16 (F502) generated by the correspondence type identification unit 124.

Specifically, the log association unit 125 makes association between the log data 11 of the types whose association is indicated by the corresponding type table 16 and the occurrence times of the log data 11 are included in the same period. Then, the log association unit 125 generates the synthesized log data 12 obtained by synthesizing the log data 11 with which the association has been made.

The damage status identification apparatus 115 identifies a damage status by referring to the synthesized log data 12 (F602) generated by the log association unit 125.

Hereinafter, the description will be given about a case where an association is made between first log data on a plurality of types of first events in a first classification and second log data on a plurality of types of second events in a second classification.

Herein, the first classification is set to a communication, and the second classification is set to an application. Accordingly, a first event is a communication event and the first log data is communication log data 21. A second event is an application event and the second log data is application log data 22.

FIG. 4 is a table illustrating examples of the communication log data 21.

The communication log data 21 are log data on communications performed between the respective clients 131 and the respective servers 132 and the log data 11 on communications performed among a firewall, an IPS (Intrusion Prevention System), an IDS (Intrusion Detection System), a proxy server, and so on, which were acquired by the network security monitoring apparatus 151. The communication log data 21 are the log data 11 stored in the communication log storage unit 141a, the communication log storage unit 142a, and the network security log storage unit 161.

Each communication log data 21 includes an occurrence date and time, a type, an access source host, an access destination host, and an access destination port. The occurrence date and time indicates a date and time when an event indicated by the communication log data 21 has occurred. The type indicates the type of the event indicated by the communication log data 21, and indicates at least one of a protocol for a communication and contents given by the communication. The access source host, the access destination host, and the access destination port respectively indicate the host of an access source, the host of an access destination, and the port of the access destination.

In FIG. 4, the communication log data 21 are aligned in the order of the occurrence dates and times.

FIG. 5 is a table illustrating examples of the application log data 22.

FIG. 5 illustrates the application log data 22.

The application log data 22 are the log data 11 on events generated by applications running on the clients 131 and the servers 132. The application log data 22 are the log data 11 stored in the process log storage unit 141b, the process log storage unit 142b, the application log storage unit 141c, and the application log storage unit 142c.

Each application log data 22 includes an occurrence date and time, a type, and contents.

The occurrence date and time indicates a date and time when an event indicated by the application log data 22 has occurred. The type indicates the type of the event indicated by the application log data 22, and indicates an application function. The contents indicate contents of the event indicated by the application log data 22.

In FIG. 5, the application log data 22 are aligned in the order of the occurrence dates and times.

Herein, as the types of the application log data 22, there are App1 to App3. The App1 indicates Web log data, the App2 indicates Mail log data, and the App3 indicates file access log data.

FIGS. 6 to 8 respectively illustrate the Web log data, the Mail log data, and the file access log data among the application log data 22 given in FIG. 5.

Each event is one object described in the log data. The event is a one-time HTTP communication or the like in the communication log data 21, and is a one-time link click or the like in the application log data 22.

\*\*\*Description of Operations\*\*\*

Figure 9:
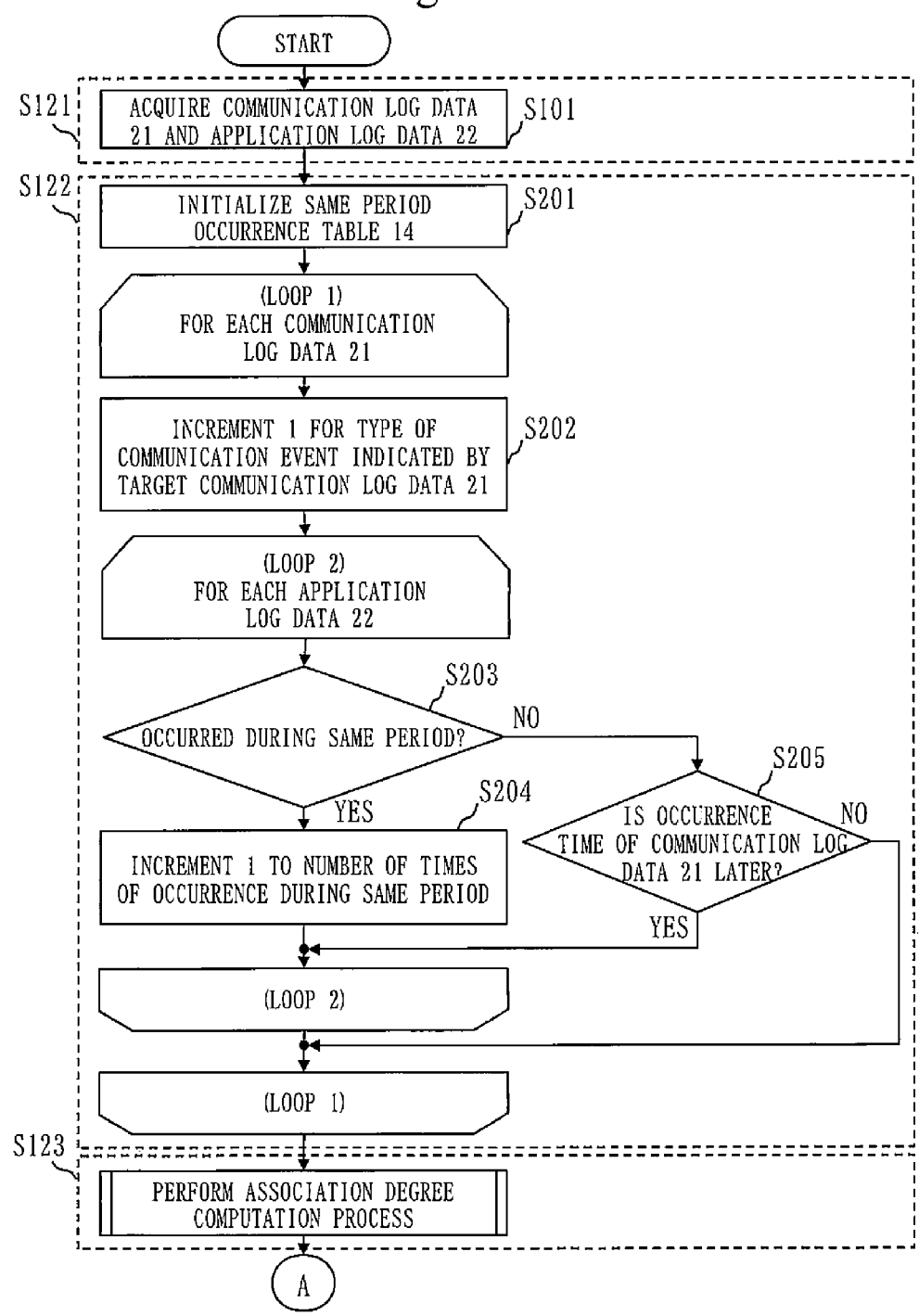
FIG. 9 is a flowchart illustrating operations of the log tracing apparatus 113 according to the first embodiment.
Figure 10:
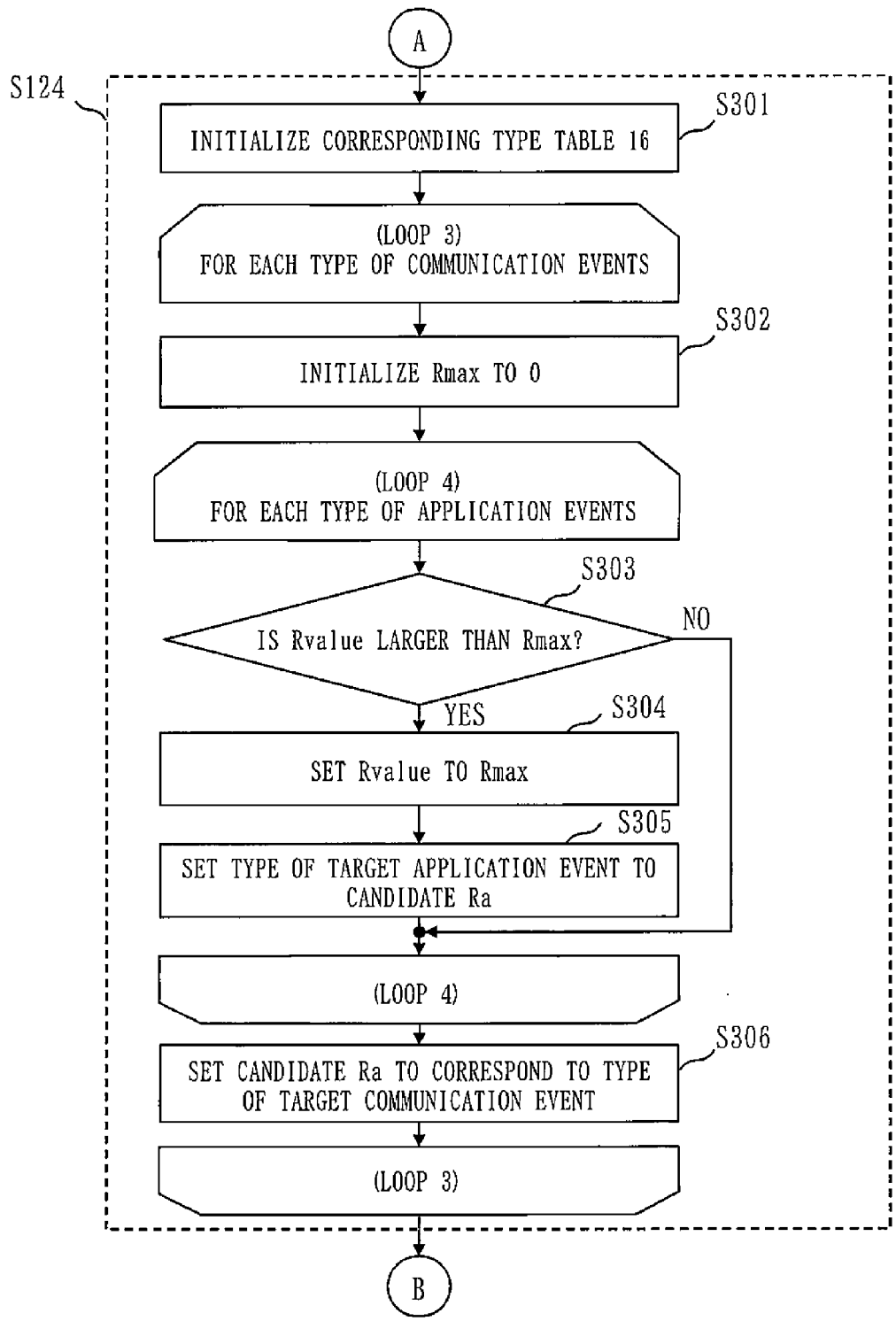
FIG. 10 is a flowchart illustrating operations of the log tracing apparatus 113 according to the first embodiment.
Figure 11:
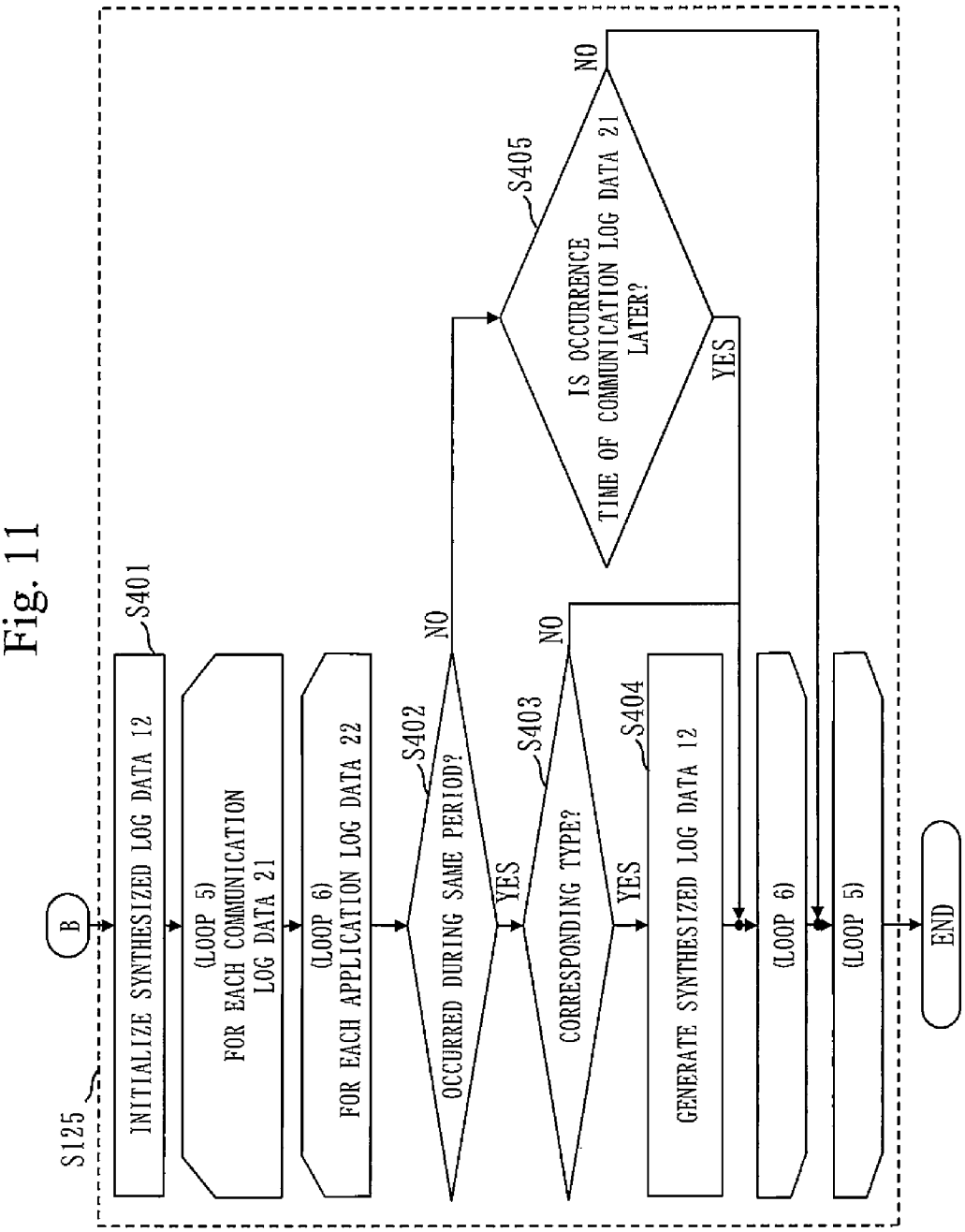
FIG. 11 is a flowchart illustrating operations of the log tracing apparatus 113 according to the first embodiment.

FIGS. 9 to 11 are flowcharts illustrating operations of the log tracing apparatus 113 according to the first embodiment.

The operations of the log tracing apparatus 113 according to the first embodiment correspond to a log tracing method according to the first embodiment. Further, the operations of the log tracing apparatus 113 according to the first embodiment correspond to a processing procedure of a log tracing program according to the first embodiment.

An acquisition process in S121 will be described.

S121 is constituted from one process in S101.

In S121, the acquisition unit 121 acquires communication log data 21 on a plurality of types of communication events and application log data 22 on a plurality of types of application events from the monitoring target log storage unit 112. The acquisition unit 121 stores the communication log data 21 and the application log data 22 acquired, as monitoring target log data 13.

A same period occurrence event identification process in S122 will be described.

In S122, the same period occurrence event identification unit 122 generates the same period occurrence table 14 that has identified the number of times at which each type of the communication events occurred during a same period as each type of the application events, upon receipt of the monitoring target log data 13.

FIG. 12 is a table illustrating an example of the same period occurrence table 14.

The type of the communication event is assigned to each row, and the type of the application event is assigned to each column, in the same period occurrence table 14. In a field where the row with the type of the communication event assigned thereto and the column with the type of the application event assigned thereto intersect, the number of times, at which the type of the communication event assigned to the row and the type of the application event assigned to the column occurred during a same period, is set.

A field, in which the number of occurrence times of each type of the communication events is set, is provided in the same period occurrence table 14.

S122 is constituted from five processes from S201 to S205.

In S201, the same period occurrence event identification unit 122 initializes all elements in the same period occurrence table 14 to 0.

Then, the same period occurrence event identification unit 122 executes the processes from S202 to S205 for each communication log data 21 included in the monitoring target log data 13 in chronological order of the occurrence date and times (loop 1). In S202, the same period occurrence event identification unit 122 increments 1 to the number of times of occurrence of the type of the communication event indicated by target communication log data 21 in the same period occurrence table 14.

Subsequently, the same period occurrence event identification unit 122 executes the processes from S203 to S205 for each application log data 22 included in the monitoring target log data 13 in chronological order of the occurrence date and times (loop 2). In S203, the same period occurrence event identification unit 122 determines whether or not a difference between the occurrence date and time of the target communication log data 21 and the occurrence date and time of target application log data 22 is within a reference period of a seconds. If the difference is within the reference period of a seconds, the same period occurrence event identification unit 122 determines that the target communication log data 21 and the target application log data 22 occurred during a same period, and causes the procedure to proceed to S204. If the difference is longer than the reference period of a seconds, the same period occurrence event identification unit 122 determines that the target communication log data 21 and the target application log data 22 occurred in different periods, and causes the procedure to proceed to S205.

In S204, the same period occurrence event identification unit 122 increments 1 to the number of times at which the type of the target communication log data 21 and the type of the target application log data 22 occurred during the same period in the same period occurrence table 14.

In S205, the same period occurrence event identification unit 122 determines whether or not the occurrence time of the target communication log data 21 is later than the occurrence time of the target application log data 22. If the occurrence time of the target communication log data 21 is later than the occurrence time of the target application log data 22, the same period occurrence event identification unit 122 causes the procedure to proceed to the end of the loop 2 because subsequent application log data 22 may have occurred during the same period as the target communication log data 21. On the other hand, if the occurrence time of the target communication log data 21 is not later than the occurrence time of the target application log data 22, the subsequent application log data 22 cannot have occurred during the same period as the target communication log data 21, and the procedure therefore exits the loop 2.

Figure 13:
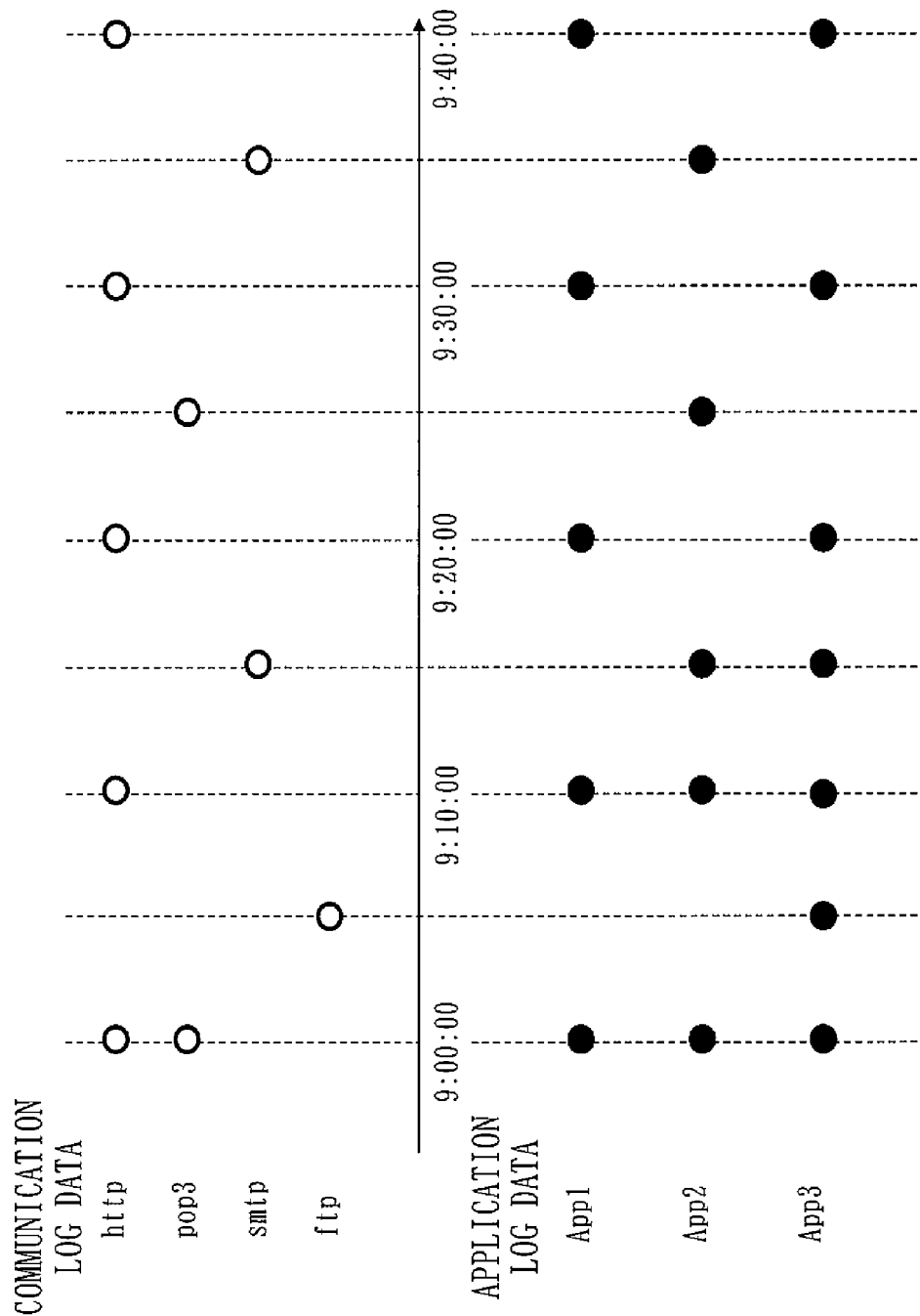
FIG. 13 illustrates time series data illustrating occurrence times of the communication log data 21 given in FIG. 4 and occurrence times of the application log data 22 given in FIG. 5.

FIG. 13 illustrates time series data indicating the occurrence times of the communication log data 21 illustrated in FIG. 4 and the occurrence times of the application log data 22 illustrated in FIG. 5.

As seen from FIG. 13, the number of times at which the type of the communication event of http occurred during a same period as the type of the application event of App1, App2, or App3 are respectively five times, twice, or five times. Further, the number of times at which the type of the communication event of the http occurred is five times. Therefore, 5, 2, and 5 are respectively set in the columns of the App1, the App2 and the App3, and 5 is set as the number of times of occurrence, in the row in FIG. 12 to which the http has been assigned.

An association degree computation process in S123 will be described.

In S123, the association degree computation unit 123 generates the association degree table 15 indicating an association degree between each type of the communication events and each type of the application events, upon receipt of the same period occurrence table 14.

Details of the process in S123 will be described later.

FIG. 14 is a table illustrating an example of the association degree table 15.

In the association degree table 15, the type of the communication event is assigned to each row and the type of the application event is assigned to each column. In a field where the row with the type of the communication event assigned thereto and the column with the type of the application event assigned thereto intersect, the association degree between the type of the communication event assigned to that row and the type of the application event assigned to that column is set.

A corresponding type identification process in S124 will be described.

In S124, the corresponding type identification unit 124 generates the corresponding type table 16 that has identified the type of the application event corresponding to each type of the communication events, upon receipt of the association degree table 15.

FIG. 15 is a table illustrating an example of the corresponding type table 16.

In the corresponding type table 16, for each type of the communication events, the corresponding type of the application event is given. The same type of the application event may correspond to a plurality of the types of the communication events.

S124 is constituted from 6 processes from S301 to S306.

In S301, the corresponding type identification unit 124 initializes the field of the corresponding type of the application event in the corresponding type table 16 to a blank.

Subsequently, the corresponding type identification unit 124 sequentially executes the processes from S302 to S306 for each type of the communication events (loop 3). That is, the processes from S302 to S306 are executed for each row of the association degree table 15. In S302, the corresponding type identification unit 124 initializes a maximum association degree Rmax of the type of a target communication event to 0.

Then, the corresponding type identification unit 124 sequentially executes the processes from S303 to S305 for each type of the application events (loop 4). That is, the processes from S303 to S305 are executed for each column of the association degree table 15. In S303, the corresponding type identification unit 124 determines whether or not an association degree Rvalue between the type of the target communication event and the type of a target application event is larger than the maximum association degree Rmax. If the Rvalue is larger than the Rmax, the corresponding type identification unit 124 causes the procedure to proceed to S304. If the Rvalue is not larger than the Rmax, the corresponding type identification unit 124 causes the procedure to proceed to the end of the loop 4.

In S304, the corresponding type identification unit 124 sets the association degree Rvalue between the type of the target communication event and the type of the target application event to the maximum association degree Rmax. In S305, the corresponding type identification unit 124 sets the type of the target application event to a candidate Ra corresponding to the type of the target communication event.

Then, in S306, the corresponding type identification unit 124 sets, in the corresponding type table 16, the type of the application event that has eventually been set to the candidate Ra, as the type of the application event corresponding to the type of the target communication event.

As illustrated in FIG. 14, the association degrees between the http and the respective types of the App1, the App2, and the App3 of the application events are 2, 0.57, and 1, respectively. Therefore, the App1 has the highest association degree. Thus, as illustrated in FIG. 15, the type of the application event corresponding to the http becomes the App1 in the corresponding type table 16.

A log association process in S125 will be described.

In S125, upon receipt of the corresponding type table 16 and the monitoring target log data 13, the log association unit 125 generates synthesized log data 12 in which the communication log data 21 and the application log data 22 have been associated.

FIG. 16 is a table illustrating examples of the synthesized log data 12.

Each synthesized log data 12 includes the occurrence date and time, the type of the communication event, the access source host, the access destination host, the access destination port, the type of the application event, and the contents. That is, the synthesized log data 12 includes both of the information included in the communication log data 21 and the information included in the application log data 22.

One occurrence date and time is used. The communication log data 21 and the application log data 22 that occurred during the same period are, however, synthesized. Thus, there is not much difference between the occurrence date and time of the communication log data 21 and the occurrence date and time of the application log data 22. Accordingly, one of the occurrence date and time of the communication log data 21 and the occurrence date and time of the application log data 22 is set to the occurrence date and time of the synthesized log data 12.

S125 is constituted from 5 processes from S401 to S405.

In S401, the log association unit 125 initializes the synthesized log data 12. Then, the log association unit 125 sequentially executes the processes from S402 to S405 for each application log data 22 with respect to each communication log data 21 (loops 5 and 6).

In S402, the log association unit 125 determines whether or not a difference between the occurrence date and time of the target communication log data 21 and the occurrence date and time of target application log data 22 is within the reference period of α seconds. If the difference is within the reference period of α seconds, the log association unit 125 determines that the target communication log data 21 and the target application log data 22 occurred during the same period, and causes the procedure to proceed to S403. If the difference is longer than the reference period of α seconds, the log association unit 125 determines that the target communication log data 21 and the target application log data 22 occurred in different periods, and causes the procedure to proceed to S405.

In S403, the log association unit 125 determines whether or not the type of the target application log data 22 is the same as the type of the application event corresponding to the type of the target communication log data 21. If the type of the target application log data 22 is the same as the type of the application event corresponding to the type of the target communication log data 21, the log association unit 125 causes the procedure to S404. If the type of the target application log data 22 is not the same as the type of the application event corresponding to the type of the target communication log data 21, the log association unit 125 causes the procedure to proceed to the end of the loop 6.

In S404, the log association unit 125 synthesizes the target communication log data 21 and the target application log data 22 to generate the synthesized log data 12.

In S405, the log association unit 125 determines whether or not the occurrence time of the target communication log data 21 is later than the occurrence time of the target application log data 22. If the occurrence time of the target communication log data 21 is later than the occurrence time of the target application log data 22, the log association unit 125 causes the procedure to proceed to the end of the loop 6 because subsequent application log data 22 may have occurred during the same period as the target communication log data 21. On the other hand, if the occurrence time of the target communication log data 21 is not later than the occurrence time of the target application log data 22, the subsequent application log data 22 cannot have occurred during the same period as the target communication log data 21. Thus, the procedure exits the loop 6.

The type of the communication log data 21 in the first row of FIG. 4 is the http. Therefore, the type of the application event corresponding to the communication log data 21 in the first row of FIG. 4 is the APP1, based on the corresponding type table 16 illustrated in FIG. 15.

The occurrence date and time of the communication log data 21 in the first row of FIG. 4 is 9:00:00 on 2014 Dec. 2. Therefore, the application log data 22 in the first row of FIG. 5, which occurred at the same time and of which the type is the App1, is associated and synthesized with the communication log data 21 in the first row of FIG. 4. Then, the synthesized log data 12 in the first row of FIG. 16 is generated.

Details of the association degree computation process in S123 will be described.

A plurality of association degree computation methods may be considered. Herein, an association degree computation method using the concept of TF-IDF (Term Frequency-Inverse Document Frequency) will be described.

The TF-IDF is a technique used for Web search, Web tagging, sentence summarization, or the like, as a method of extracting an important word in a sentence. The concept of the TF-IDF is as follows. The larger the frequency of appearance of a word in the sentence is, the higher the possibility of the word becoming the important word is. On the other hand, it is highly likely that a word that appears in various sentences is not important. The word that appears in the various sentences is a word such as "the" in English. There is a formula using two values of a TF value and an IDF value in the TF-IDF.

Formulas 11 to 13 give the association degree computation method using the concept of the TF-IDF.

$$tf_{i,j} = \frac{n_{i,j}}{n_j} \quad \text{[Formula 11]}$$

$$idf_i = \log\left(\frac{N}{df_i}\right) + 1 \quad \text{[Formula 12]}$$

$$tfidf_{i,j} = tf_{i,j} \times idf_i \quad \text{[Formula 13]}$$

$tf_{i,j}$ given in Formula 11 is a value corresponding to the TF value in the TF-IDF, and is a same period probability between a type $d_j$ of the communication events and a type $t_i$ of the application events. $n_{i,j}$ is the number of times at which the communication event $d_j$ and the type $t_i$ of the application event occurred during a same period. $n_j$ is the number of times at which the type $d_j$ of the communication event occurred.

$idf_i$ given in Formula 12 is a value corresponding to the IDF value in the TF-IDF. N is the number of all the types of the communication events. $df_i$ is the number of the types of the communication events each of which occurred during the same period as the type $t_i$ of the application event.

$tfidf_{i,j}$ given in Formula 13 is a value corresponding to a TF-IDF value in the TF-IDF, and is an association degree between the type $d_j$ of the communication event and the type $t_i$ of the application event when the concept of the TF-IDF is used.

Figure 17:
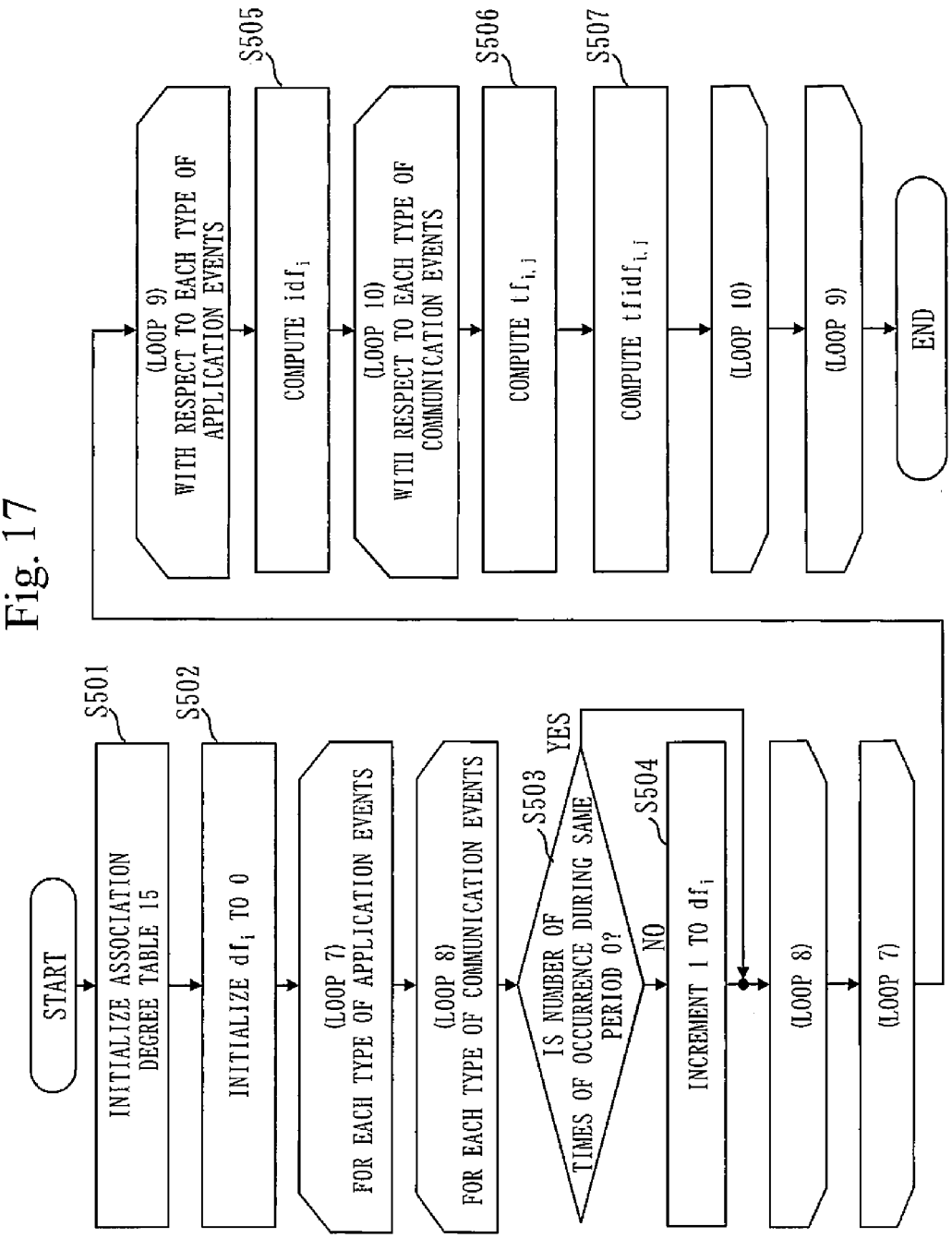
FIG. 17 is a flowchart illustrating an association degree computation method using the concept of TF-IDF.

FIG. 17 is a flowchart illustrating the association degree computation method using the concept of the TF-IDF.

The association degree computation method using the concept of the TF-IDF is constituted from 7 processes from S501 to S507.

In S501, the association degree computation unit 123 initializes all elements in the association degree table 15 to 0. In S502, the association degree computation unit 123 initializes the number $df_i$ of the types of the communication events each of which occurred during the same period as each type $t_i$ of the application events.

Subsequently, the association degree computation unit 123 executes the processes from S503 to S504 for each type of the communication events with respect to each type of the application events (loops 7, 8)

In S503, the association degree computation unit 123 determines whether or not, in the same period occurrence table 14, the number of times at which the type $t_i$ of the target application event and the type $d_j$ of the communication event occurred during the same period is 0. If the number of times at which the type $t_i$ of the target application event and the type $d_j$ of the communication event occurred during the same period is not 0 in the same period occurrence table 14, the association degree computation unit 123 causes the procedure to proceed to S504. If the number of times at which the type $t_i$ of the target application event and the type $d_j$ of the communication event occurred during the same period is 0, the association degree computation unit 123 causes the procedure to proceed to the end of the loop 8. In S504, the association degree computation unit 123 increments 1 to the number $df_i$ of the types of the communication events each of which occurred during the same period as the type $t_i$ of the target application event.

Subsequently, the association degree computation unit 123 executes the processes from S505 to S507 for each type $t_i$ of the application events (loop 9).

In S505, the association degree computation unit 123 computes the IDF value $idf_i$ using Formula 12, upon receipt of the number N of all the types of the communication events and the number $df_i$ of the types of the communication events each of which occurred during the same period as the type $t_i$ of the target application event.

Then, the association degree computation unit 123 executes the processes from S506 to S507 for each type of the communication events in the same period occurrence table 14 with respect to the type $t_i$ of the target application event (loop 10).

In S506, the association degree computation unit 123 computes the TF value $tf_{i,j}$ being the same period probability, using Formula 11, upon receipt of the number of times at which the type $t_i$ of the target application event and the type $d_j$ of the target communication event occurred during the same period and the number of times at which the type $d_j$ of the communication event occurred, which are in the same period occurrence table 14.

In S507, using Formula 13, the association degree computation unit 123 computes the association degree $tfidf_{i,j}$, using Formula 13, upon receipt of the IDF value $idf_i$ computed in S505 and the TF value $tf_{i,j}$ computed in S506.

The association degree between the App1 and the http is computed, using the same period occurrence table 14 illustrated in FIG. 12. FIG. 14 illustrates the association degree table 15 computed, using the same period occurrence table 14 illustrated in FIG. 12.

The App1 occurs in a same period as each of two types of communication events being the http and pop3. There are four types of the communication events being the http, smtp, the pop3, and ftp. Therefore, the IDF value $idf_i$ of the App1 becomes log (4/2)+1=2. Herein, the base of the log is 2.

The number of times of occurrence of the App1 and the http in the same period is 5, and the number of times of occurrence of the http is 5. Therefore, the TF value $tf_{i,j}$ that is the same period probability between the App1 and the http is 5/5=1.

Accordingly, as illustrated in FIG. 14, the association degree $tfidf_{i,j}$ between the App1 and the http becomes 1×2=2.

As described above, the log tracing apparatus 113 according to the first embodiment computes an association degree between the log data 11, using a same period occurrence probability, and makes association between the log data based on the association degree and the occurrence times. Therefore, an association between the log data 11 may be identified without performing learning in advance and without using a common identifier. Since it is not necessary to perform the learning in advance and use the common identifier, introduction into an existing system is easy.

By making association between the log data by the log tracing apparatus 113, it becomes possible for the damage status identification apparatus 115 to readily identify a damage status by an attack.

Assume that association between the communication log data 21 and the application log data 22 is made, as in the above-mentioned example, for example. Then, if a suspicious communication is detected, it may identify by which application that communication occurred. The contents of damage, an influence range, and so on may be thereby grasped.

The log tracing apparatus 113 according to the first embodiment computes the association degree, using the concept of the TF-IDF. Therefore, as compared with a case where the same period occurrence probability is just set to the association degree, it is possible to appropriately compute the association degree.

Second Embodiment

In the first embodiment, the association degree has been computed, using the concept of the TF-IDF. In a second embodiment, an association degree is computed using the concept of entropy, which is different from the first embodiment. This difference will be described in the second embodiment.

The entropy represents uncertainty of information.

Formulas 14 to 17 indicate an association degree computation method using the concept of the entropy.

$$Pr_{i,j} = \frac{n_{i,j}}{n_j} \qquad \text{[Formula 14]}$$

$$RPr_{i,j} = \frac{Pr_{i,j}}{\sum_j Pr_{i,j}} \qquad \text{[Formula 15]}$$

$$IE_i = -\sum_j RPr_{i,j} \cdot \log(RPr_{i,j}) \qquad \text{[Formula 16]}$$

$$RS_{i,j} = \frac{Pr_{i,j}}{IE_i} \qquad \text{[Formula 17]}$$

$Pr_{i,j}$ given in Formula 14 is a same period probability between a type $d_j$ of a communication event and a type $t_i$ of an application event. $n_{i,j}$ is the number of times at which the communication event $d_j$ and the type $t_i$ of the application event occurred during a same period. $n_j$ is the number of times at which the type $d_j$ of the communication event occurred.

$RPr_{i,j}$ given in Formula 15 is an association probability representing a probability that the type $t_i$ of the application event and the type $d_j$ of the communication event are associated. $\Sigma_j Pr_{i,j}$ is a sum of same period probabilities between the type $t_i$ of the application event and respective types of communication events.

$IE_i$ given in Formula 16 is the entropy of the type $t_i$ of the application event. $\Sigma_j RPr_{i,j}$ is a sum of association probabilities between the type $t_i$ of the application event and the respective types of the communication events.

$RS_{i,j}$ given in Formula 17 is an association degree between the $d_j$ of the communication event and the type $t_i$ of the application event when the concept of the entropy is used.

Figure 18:
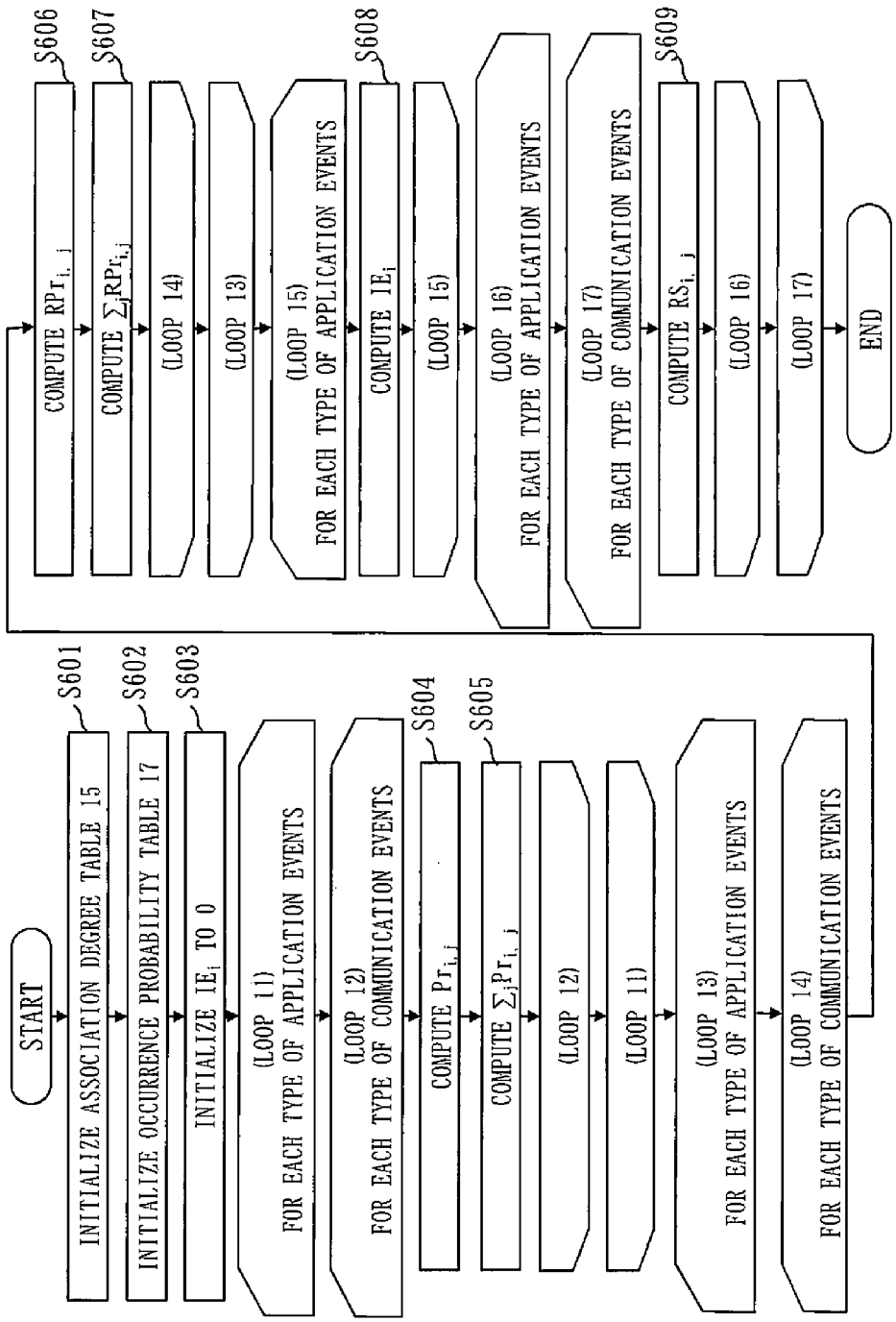
FIG. 18 is a flowchart illustrating an association degree computation method using the concept of entropy.

FIG. 18 is a flowchart illustrating the association degree computation method using the concept of the entropy.

In the association degree computation using the concept of the entropy, an occurrence probability table 17 is used.

FIG. 19 is a table illustrating an example of the occurrence probability table 17.

In the occurrence probability table 17, the type of a communication event is assigned to each row, and the type of an application event is assigned to each column. In a field where the row with the type of the communication event assigned thereto and the column with the type of the application event assigned thereto intersect, a same period probability that the type of the communication event assigned to the row and the type of the application event assigned to the column occurred during a same period is set.

A field where the sum of same period probabilities is set is provided in the occurrence probability table 17, for each type of the application events.

The association degree computation method using the concept of the entropy is constituted from processes from S601 to S609.

In S601, the association degree computation unit 123 initializes all the elements in the association degree table 15 to 0. In S602, the association degree computation unit 123 initializes all elements in the occurrence probability table 17 to 0. In S603, the association degree computation unit 123 initializes the entropy $IE_i$ of each type $t_i$ of the application events to 0.

Subsequently, the association degree computation unit 123 executes the processes from S604 to S605 for each type of the communication events with respect to each type of the application events (loops 11 and 12).

In S604, the association degree computation unit 123 computes the $Pr_{i,j}$ using Formula 14, upon receipt of the number of times at which the type $t_i$ of a target application event and the type $d_j$ of a target communication event occurred during the same period and the number of times at which the type $d_j$ of the communication event occurred, which are in the same period occurrence table 14. In S605, the association degree computation unit 123 adds the $PR_{i,j}$ computed in S604 to the $\Sigma_j Pr_{i,j}$ with respect to the type $t_i$ of the target application event. With this arrangement, the occurrence probability table 17 is generated.

Then, the association degree computation unit 123 executes the processes from S606 to S607 for each type of the communication events, with respect to each type of the application events (loops 13 and 14).

In S606, the association degree computation unit 123 computes the association probability $RPr_{i,j}$ using Formula 15, upon receipt of the same period probability $PR_{i,j}$ between the type $t_i$ of the target application event and each type of the communication events and the $\Sigma_j Pr_{i,j}$ being the sum of the same period probabilities with respect to the target application, which are in the occurrence probability table 17. In S607, the association degree computation unit 123 adds the association probability $RPr_{i,j}$ computed in S606 to the $\Sigma_j RPr_{i,j}$ being the sum of the association probabilities with respect to the type $t_i$ of target application event.

Subsequently, the association degree computation unit 123 executes the process in S608 for each type of the application events (loop 15).

In S608, the association degree computation unit 123 computes the entropy $IE_i$, using Formula 16, upon receipt of the association probability $PR_{i,j}$ between the type $t_i$ of the target application event and each type of the communication events computed in S606 and the $\Sigma_j RPr_{i,j}$ being the sum of the association probabilities with respect to the type $t_i$ of the target application event computed in S607.

Then, the association degree computation unit 123 executes the process in S609 for each type of the communication events with respect to each type of the application events (loops 16 and 17).

In S609, the association degree computation unit 123 computes the association degree $RS_{i,j}$ using Formula 17, upon receipt of the same period probability $Pr_{i,j}$ between the type $t_i$ of the target application event and the type $d_j$ of the target communication event computed in S604 and the entropy $IE_i$ with respect to the type $t_i$ of the target application event computed in S608.

The association degree between the App1 and the http is computed, using the same period occurrence table 14 illustrated in FIG. 12. FIG. 20 is a table illustrating the association degree table 15 computed using the same period occurrence table 14 given in FIG. 12.

The number of times of occurrence of the App1 and the http in the same period is 5, and the number of times of occurrence of the http is 5. Therefore, the same period probability $Pr_{i,j}$ between the App1 and the http is 5/5=1. Similarly, the number of times of occurrence of the App1 and the pop3 in a same period is 1, and the number of times of occurrence of the pop3 is 2. Therefore, the same period probability $Pr_{i,j}$ between the App1 and the pop3 is 1/2=0.5. Accordingly, the sum $\Sigma_j Pr_{i,j}$ of the same period probabilities with respect to the App1 is 1+0.5=1.5.

Therefore, the association probability $RPr_{i,j}$ between the App1 and the http is 1/1.5=0.66. The association probability $RPr_{i,j}$ between the App1 and the pop3 is 0.5/1.5=0.33. It can be seen from these probabilities that the probability that the http is associated with the App1 is twice as large as the probability that the pop3 is associated with the App1.

The entropy IEi of the APP1 is −0.66×log (0.66)−0.33×log (0.33)=0.39+0.53=0.92. Then, the association degree $RS_{i,j}$ is 1/0.92=1.1

As mentioned above, the log tracing apparatus 113 according to the second embodiment computes an association degree, using the concept of the entropy. Therefore, it is possible to appropriately compute the association degree from an aspect different from that of the log tracing apparatus 113 according to the first embodiment.

Third Embodiment

In each of the first and second embodiments, the corresponding type identification unit 124 makes association between the log data 11, based on the association degree table 15. In a third embodiment, association between the log data 11 may be performed by an input of a user, which is different from the first and second embodiments. This difference will be described in the third embodiment.

Figure 21:
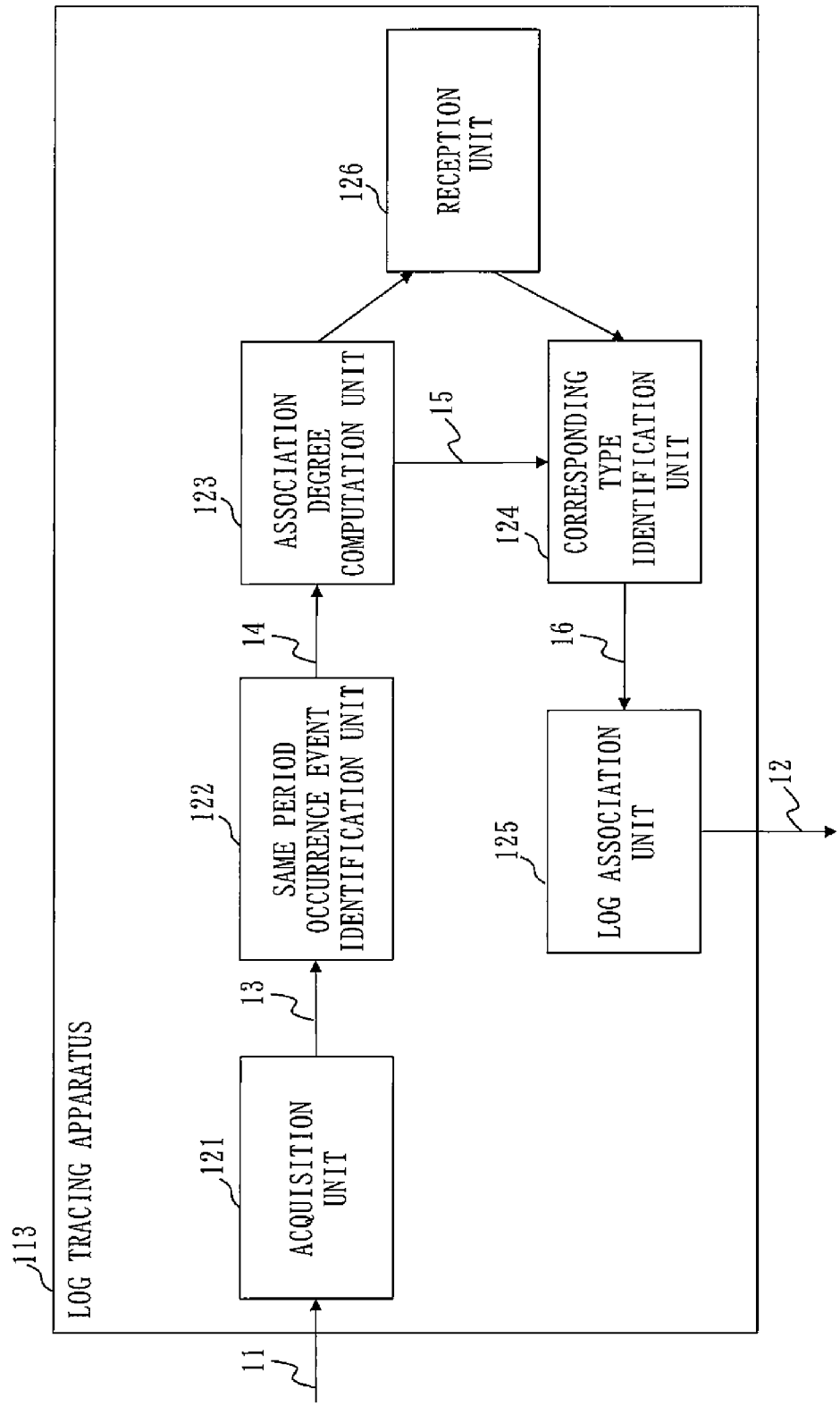
FIG. 21 is a configuration diagram of the log tracing apparatus 113 according to a third embodiment.

FIG. 21 is a configuration diagram of the log tracing apparatus 113 according to the third embodiment.

The log tracing apparatus 113 illustrated in FIG. 21 includes a reception unit 126, in addition to the components included by the log tracing apparatus 113 illustrated in FIG. 2. The reception unit 126 receives an input of a corresponding type of an event from the monitoring terminal 116.

When the reception unit 126 receives the input for association between event types, the log association unit 125 makes association between the log data whose occurrence times are included in a same period and which are with respect to the corresponding type received by the reception unit 126.

Figure 22:
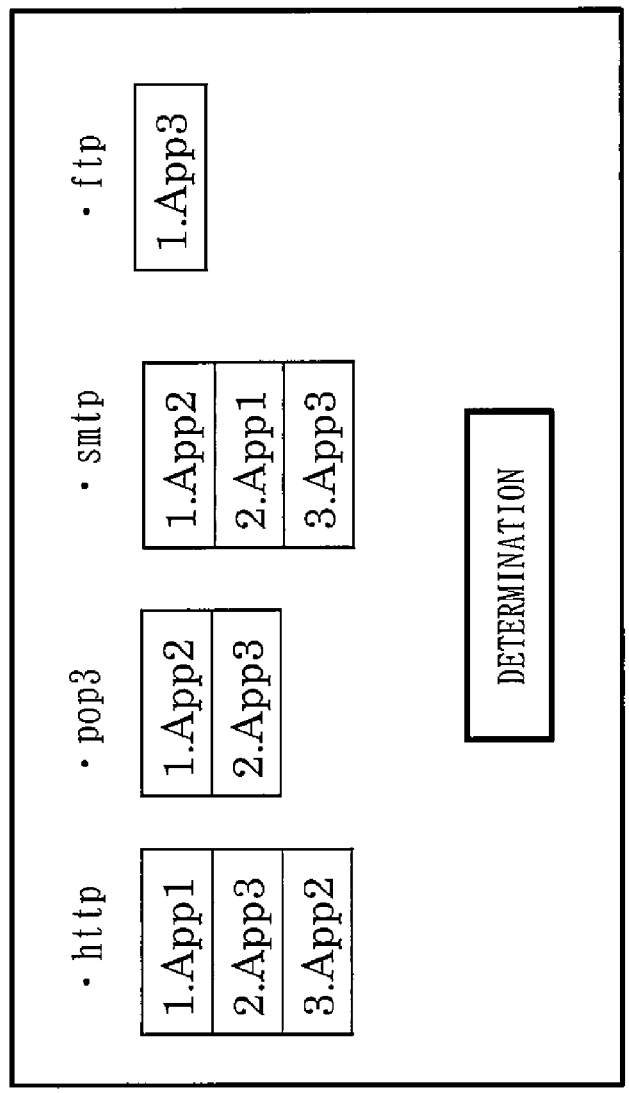
FIG. 22 is a diagram illustrating an example of an input screen displaying associations among log data 11.

FIG. 22 is a diagram illustrating an example of an input screen for association between the log data 11.

The types of one or more application events whose association degrees are not 0 in the association degree table 15 are displayed on the input screen illustrated in FIG. 22, as candidates for the association with respect to each type of the communication events. More specifically, the candidates for the association are displayed in the descending order of the association degrees of the types of the application events. The reception unit 126 displays the input screen as illustrated in FIG. 22 to receive the input of the corresponding type of the event from the monitoring terminal 116.

As mentioned above, the log tracing apparatus 113 according to the third embodiment receives the input of the corresponding type of the event. The number of events that occurred may be small, so that association may be difficult. In such a case, it is effective to enable association between types of the events by using the input from the user.

FIG. 23 is a diagram illustrating an example of a hardware configuration of the log tracing apparatus 113 according to each of the first to third embodiments.

The log tracing apparatus 113 is a computer.

The log tracing apparatus 113 includes hardware such as a processor 901, an auxiliary storage device 902, a memory 903, a communication device 904, an input interface 905, and a display interface 906.

The processor 901 is connected to the other hardware via a signal line 910 to control these other hardware.

The input interface 905 is connected to an input device 907 via a cable 911.

The display interface 906 is connected to a display 908 via a cable 912.

The processor 901 is an IC (Integrated Circuit) to perform processing. The processor 901 is a CPU (Central Processing Unit), a DSP (Digital Signal Processor), or a GPU (Graphics Processing Unit), for example.

The auxiliary storage device 902 is a ROM (Read Only Memory), a flash memory, or an HDD (Hard Disk Drive).

The memory 903 is a RAM (Random Access Memory), for example.

The communication device 904 includes a receiver 9041 to receive data and a transmitter 9042 to transmit the data. The communication device 904 is a communication chip or an NIC (Network Interface Card), for example.

The input interface 905 is a port to which the cable 911 of the input device 907 is connected. The input interface 905 is a USB (Universal Serial Bus) terminal, for example.

The display interface 906 is a port to which the cable 912 of the display 908 is connected. The display interface 906 is a USB terminal or an HDMI® (High Definition Multimedia Interface) terminal, for example.

The input device 907 is a mouse, a keyboard, or a touch panel, for example.

The display 908 is an LCD (Liquid Crystal Display), for example.

A program to implement functions of the acquisition unit 121, the same period occurrence event identification unit 122, the association degree computation unit 123, the corresponding type identification unit 124, the log association unit 125, and the reception unit 126 (hereinafter, the acquisition unit 121, the same period occurrence event identification unit 122, the association degree computation unit 123, the corresponding type identification unit 124, the log association unit 125, and the reception unit 126 will be collectively written as a "unit") described above is stored in the auxiliary storage device 902.

This program is loaded to the memory 903, is read into the processor 901, and is executed by the processor 901.

Further, an OS (Operating System) is also stored in the auxiliary storage device 902.

Then, at least a part of the OS is loaded into the memory 903, and the processor 901 executes the program to implement the functions of the "unit" while executing the OS.

Though FIG. 23 illustrates one processor 901, the log tracing apparatus 113 may include a plurality of the processors 901. Then, the plurality of the processors 901 may cooperate and execute the program to implement the functions of the "unit".

Information, data, a signal value, and a variable value indicating results of processes of the "unit", and information, data, a signal value, and a variable value stored in the corresponding information storage unit 21 are stored in the memory 903, the auxiliary storage device 902, or a register or a cache memory in the processor 901, as files.

The "unit" may be provided by "circuitry". Alternatively, the "unit" may be read as a "circuit", a "step", a "procedure", or a "process". The "circuit" and the "circuitry" are a concept including not only the processor 901 but also a different type of processing circuit such as a logic IC, a GA (Gate Array), an ASIC (Application Specific Integrated Circuit), or an FPGA (Field-Programmable Gate Array).

REFERENCE SIGNS LIST

101: security monitoring system, 102: monitoring target network system, 111: log collection apparatus, 112: monitoring target log storage unit, 113: log tracing apparatus, 114: attack detection apparatus, 115: damage status identification apparatus, 116: monitoring terminal, 121: acquisition unit, 122: same period occurrence event identification unit, 123: association degree computation unit, 124: corresponding type identification unit, 125: log association unit, 126: reception unit, 131: client, 132: server, 141, 142: log storage unit, 151: network security monitoring apparatus, 161: network security log storage unit, 171: Internet, 11: log data, 12: synthesized log data, 13: monitoring target log data, 14: same period occurrence table, 15: association degree table, 16: corresponding type table, 17: occurrence probability table

The invention claimed is:
1. A log tracing apparatus comprising:
processing circuitry:
to acquire log data indicating occurrence times of a respective plurality of types of events;
to compute a same period probability between the respective types of the events that occurred during a same period, based on the occurrence times indicated by the log data acquired and to compute an association degree between the respective types, using the same period probability;
to identify the types corresponding to each other, based on the association degree computed;
to make association between the log data of the corresponding types identified and with the occurrence times thereof included in the same period,
wherein the processing circuitry acquires first log data on a plurality of types of first events in a first classification and second log data on a plurality of types of second log data in a second classification;
wherein the processing circuitry computes the same period probability between each type of the first events and each type of the second events that occurred during the same period, and computes the association degree between each type of the first events and each type of the second events, using the same period probability computed;
wherein the processing circuitry identifies the type of second event corresponding to the type of the first event, and
wherein the processing circuitry computes the association degree between a certain type $d_j$ of the first event and a certain type $t_i$ of the second event, using the same period probability between the type $d_j$ of the first event and the type $t_i$ of the second event and a number of the types of the first events each of which occurred during the same period as the type $t_i$.

2. The log tracing apparatus according to claim 1, wherein the processing circuitry computes the association degree between the type $d_j$ and the type $t_i$ so that the higher the same period probability is, the higher the association degree becomes and so that the smaller the number of the types is, the higher the association degree becomes.

3. The log tracing apparatus according to claim 2, wherein the processing circuitry computes the association degree of tfidf$_{i,j}$ between the type $d_j$ and the type $t_i$ using Formula 1 where the same period probability between the type $d_j$ and the type $t_i$ is represented by tf$_{i,j}$, a number of all the types of the first events is represented by N, and the number of the types of the first events each of which occurred during the same period as the type $t_i$ is represented by df$_i$:

$$tfidf_{i,j} = tf_{i,j} \times idf_i \quad \text{[Formula 1]}$$
$$idf_i = \log\left(\frac{N}{df_i}\right) + 1.$$

4. The log tracing apparatus according to claim 1, wherein, regarding each type of the first events as a target type, the processing circuitry computes an association probability between a certain type $t_i$ of the second event and the target type, the association probability being obtained by dividing the same period probability between the type $t_i$ and the target type of the first event by a sum of the same period probabilities between the type $t_i$ of the second event and the respective types of the first events, and computes the association degree between a certain type $d_j$ of the first event and the type $t_i$, using the association probability between the type $t_i$ and the type $d_j$ and an entropy of the type $t_i$ obtained from the association probability for each type.

5. The log tracing apparatus according to claim 4, wherein the processing circuitry computes the association degree between the type $d_j$ and the type $t_i$ so that the higher the same period probability between the type $d_j$ and the type $t_i$ is, the higher the association degree becomes, and the smaller the entropy is, the higher the association degree becomes.

6. The log tracing apparatus according to claim 5, wherein the processing circuitry computes the association degree of RS$_{i,j}$ between the certain type $d_j$ of the first event and the certain type $t_i$ of the second event using Formula 2 where the same period probability between the type $d_j$ and the type $t_i$ is represented by PR$_{i,j}$ and the entropy of the type $t_i$ is represented by IE$_i$:

$$RS_{i,j} = \frac{Pr_{i,j}}{IE_i}. \quad \text{[Formula 2]}$$

7. The log tracing apparatus according to claim 1, wherein the processing circuitry:
receives an input of one of the corresponding types; and
wherein the processing circuitry makes association between the log data with respect to the corresponding type received and with the occurrence times thereof included in the same period.

8. A non-transitory computer-readable medium storing a log tracing program to cause a computer to execute:
an acquisition process of acquiring log data indicating occurrence times of a respective plurality of types of events;
an association degree computation process of computing a same period probability between the respective types of the events that occurred during a same period, based on the occurrence times indicated by the log data acquired by the acquisition process and computing an association degree between the respective types, using the same period probability;
a corresponding type identification process of identifying the types corresponding to each other, based on the association degree computed by the association degree computation process; and
a log association process of making association between the log data of the corresponding types identified by the corresponding type identification process and with the occurrence times thereof included in the same period,
wherein the acquisition process acquires first log data on a plurality of types of first events in a first classification and second log data on a plurality of types of second log data in a second classification;
wherein the association degree computation process computes the same period probability between each type of the first events and each type of the second events that occurred during the same period, and computes the association degree between each type of the first events and each type of the second events, using the same period probability computed;
wherein the corresponding type identification process identifies the type of second event corresponding to the type of the first event; and
wherein the association degree computation process computes the association degree between a certain type $d_j$ of the first event and a certain type $t_i$ of the second event, using the same period probability between the type $d_j$ of the first event and the type $t_i$ of the second event and a number of the types of the first events each of which occurred during the same period as the type $t_i$.

* * * * *